United States Patent
Dorlars

[15] 3,697,596
[45] Oct. 10, 1972

[54] PRODUCTION OF ARYL-α-OXIMINOALKYLKETONES

[72] Inventor: Alfons Dorlars, Leverkusen, Germany

[73] Assignee: Farbenfabriken Bayer Aktiengesellschaft, Leverkusen, Germany

[22] Filed: Aug. 5, 1968

[21] Appl. No.: 750,250

[52] U.S. Cl. .......................... 260/465 E, 260/566 A
[51] Int. Cl. ............................................. C07c 131/00
[58] Field of Search ..................... 260/566 A, 465 E

[56] References Cited

UNITED STATES PATENTS

| | | | |
|---|---|---|---|
| 2,731,499 | 1/1956 | Coraor | 260/566 A |
| 2,248,035 | 7/1941 | Hartung et al. | 260/566 |
| 3,090,812 | 6/1963 | Wilbert et al. | 260/566 |

OTHER PUBLICATIONS

Adams, Organic Reactions VII, Chapter 6, pg. 350 (1963)
Adams, Organic Reactions Vol. VII, (1963) Chapter 6, pg. 330.
Slater, J. Chem. Soc. (London) 117, 587–591 (1920)

*Primary Examiner*—Howard T. Mars
*Assistant Examiner*—Gerald A. Schwartz
*Attorney*—Burgess, Dinklage & Sprung

[57] ABSTRACT

Aromatic-alkyl ketones are reacted with from 0.1 to 50 mol percent of an alkyl nitrite to form the corresponding aryl-α-oximinoketone which is then extracted from the reaction mixture and recovered. Consumed ketone can then be replenished and again reacted with alkyl nitrite.

9 Claims, 1 Drawing Figure

PATENTED OCT 10 1972
3,697,596
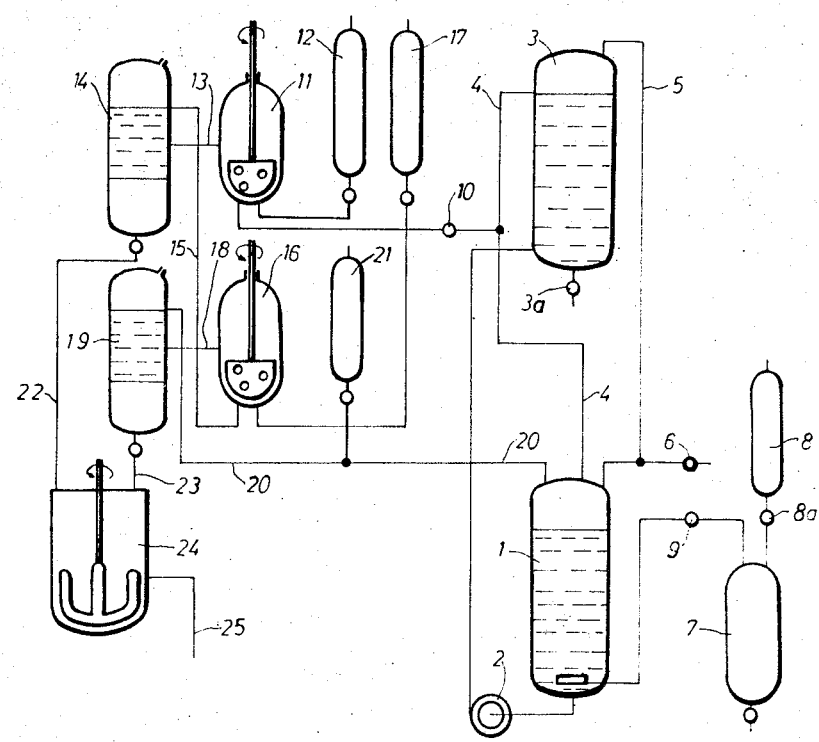
INVENTOR.
ALFONS DORLARS
BY
Burgess, Dinklage & Sprung
ATTORNEYS

PRODUCTION OF ARYL-α-OXIMINOALKYLKETONES

The present invention relates to an improved and efficient process of producing aryl-α-oximinoalkylketones.

It is known to produce α-oximino compounds of mixed aromatic-aliphatic ketones according to Claisen and Sandmeyer by the reaction of ketones and alkyl nitrites in the presence of acids, in particular hydrogen chloride (Berichte der Deutschen Chemischen Gesellschaft, Vol. 20 [1887], p. 252 and 639; Organic Reactions, Vol. VII, p. 351). In this process a slightly larger quantity of alkyl nitrite than the stoichiometrical one is caused to react in the presence of hydrogen chloride, the quantity of which varies in each particular case, upon a solution of the ketone to be reacted in a suitable solvent. The resulting aryl-α-oximinoalkylketone is recovered from the mixture either by extraction with an aqueous alkali metal solution and precipitation with acid, or it is isolated by distilling off the solvent or by precipitation with water. This prior art process however suffers from certain disadvantages which involve considerable drawbacks in the large scale production.

A considerable disadvantage of the afore-described prior art process are the yields which are mostly moderate and which exceed 70 – 75 percent of the theoretical under most favorable conditions only. Besides, the degree of purity of the resulting α-oximinoketones, which is insufficient for most application fields, generally requires an additional after-treatment operation. This applies especially to the conversion of arylmethylketones of the aryl-CO-CH$_3$ type, for example acetophenone, into the corresponding α-oximino derivatives which are obtained in a substantially lower yield and purity than the oximino compounds of the higher arylalkylketones of the aryl-CO-CH$_2$-alkyl type. Acetophenone, for example, can be reacted according to the Claisen and Sandmeyer method at a rate of 40 percent only, whereas propiophenone yields at most 75 percent under equal conditions (Journal of the Chemical Society, London, Vol. 117 [1920], p. 5907). Besides, the yields of oximinoacetophenone vary within wide limits; they are indicated as 6 – 12 percent (Journal of the American Chemical Society, Vol. 52 [1930], p. 3317) or 2.9 percent of the theoretical (Journal of the American Chemical Society, Vol. 72 [1950], p. 802). The oximinoacetophenones which are less readily available have therefore frequently been prepared via the expensive benzoyl acetic esters; oximinoacetophenone, for example, is obtained in a yield of 63 percent by hydrolysis of benzoyl acetic ester, nitrosating the resulting benzoyl acetic acid and decarboxylation (Journal of the American Chemical Society, Vol. 76 [1954], p. 4563).

Diethylether and alcohols are generally applied as solvent. Diethylether, as a weak base, brings about an increased catalytical activity of hydrogen chloride so that a low concentration of hydrogen chloride will suffice at the beginning of the nitrosation reaction (cf. for example the nitrosation of propiophenone: Journal of the American Chemical Society, Vol. 51 [1929], p. 2262 – 2266; Organic Syntheses, Collective volume II, p. 363 – 364). As the reaction proceeds the concentration of the alcohol resulting from the alkyl nitrite increases so that the displacement of the equilibrium preceding the nitrosation reaction:

alkyl nitrite + hydrogen chloride ⇌ alcohol + nitrosyl chloride to the left has to be counteracted by the continuous addition of hydrogen chloride if the nitrosation reaction by nitrosyl chloride is to proceed at a satisfactory rate.

Because of its ready inflamability and danger of explosion, diethylether is not very suitable for the application on a technical scale. Therefore, diethylether has been replaced by alcohols. U. S. Pat. No. 3,090,812, for example, describes the nitrosation reaction of propiophenone in methanol, i.e. a modification leading to better yields as compared with the diethylether method. Nevertheless, this process also remains unsatisfactory, since working in methanol instead of in diethylether necessitates a very considerable increase of the concentration of anhydrous hydrogen chloride, as follows from the aforesaid statements. Since oximinopropiophenone is isolated by precipitation with water, large amounts of strong aqueous methanolic hydrochloric acid are formed as waste products. The expenditure for the regeneration of the solvents, or the removal of the excess amounts of acid is a considerable disadvantage that deleteriously affects the economy of the process.

In accordance with the present invention it has now been found that α-oximinoketones of the formula

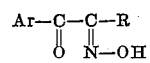

in which Ar represents an optionally substituted aromatic radical, and R stands for hydrogen, an alkyl radical or a methylene group which is directly linked to Ar, or salts of α-oximinoketones are obtained from a ketone of the formula

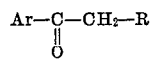

in which Ar and R have the meaning as aforesaid, an alkyl nitrite and hydrogen halide or a compound yielding hydrogen halide, in very good yields and in a state of high purity by reacting the ketone, dissolved in an indifferent, water-immiscible organic solvent, with an alkyl nitrite in the presence of hydrogen halide and in a quantity which is insufficient for effecting complete nitrosation reaction, extracting the reaction mixture with an aqueous alkaline reacting solution, alternately incompletely nitrosating and extracting again, as often as desired, the extracted mixture after replenishing the consumed ketone, and optionally recovering the α-oximinoketones or the salts thereof from the aqueous alkaline extracts.

The aromatic radical Ar preferably represents an optionally substituted phenyl or naphthyl radical, while R preferably stands for hydrogen or a chain or branched lower alkyl radical with up to five carbon atoms, which, in the case of C = 1, can be linked to Ar directly. Examples of substituents of the radical Ar are halogen atoms, such as fluorine, chlorine and/or bromine; lower alkyl radicals, such as the methyl, ethyl, n-propyl, iso-propyl, n-butyl, iso-butyl, tertiary butyl and/or amyl radical; a phenyl radical which may be substituted by fluorine, chlorine, bromine, lower alkyl or alkoxy; lower alkoxy groups, such as the methoxy, ethoxy, n- and i-propoxy, and/or butoxy group; a phenoxy group which may be substituted by fluorine, chlorine, bromine, lower alkyl or alkoxy; the nitro group and cyanogen. As ketones which can be reacted in the herein described process and which correspond to the above formula, there can be used all arylalkylketones which are free of substituents undergoing reaction with nitrous acid or derivatives thereof, for example amino groups or substituents which already impart solubility to the starting ketone in water or aqueous alkaline solutions, for example sulphonic acid, carboxylic acid and hydroxyl groups. Examples of ketones which can be used in the herein described process are acetophenone, m- and p-fluoroacetophenone, m- and p-chloroacetophenone, m- and p-bromoacetophenone, 3,4-dichloroacetophenone, o-, m- and p-methylacetophenone, p-ethylaceto phenone, p-propylacetophenone, p-butylacetophenone, o-, m- and p-methoxyacetophenone, o-, m- and p-ethoxyacetophenone, p-methylvalerophenone, p-phenylacetophenone, 2-methoxy-4-methylacetophenone, α-acetonaphthone, β-acetonaphtone, propiophenone, o-, m- and p-fluoropropiophenone, o-, m- and p-chloropropiophenone, o-, m- and p-bromopropiophenone, m-cyanopropiophenone, o- and p-methoxypropiophenone, p-methyl- and ethyl-propiophenone, butyrophenone, p-methylbutyrophenone, p-methoxybutyrophenone, valerophenone, p-methylvalerophenone, caprophenone, indanone-(1), 3-, 4-, 5- or 6-methylindanone-(1).

The reaction of acetophenone with methyl nitrite gas in the presence of hydrogen chloride shows that the absorption of methyl nitrite initially proceeds substantially completely that, however, the absorption gradually slows down after nitrosation of part of the acetophenone present in spite of the introduction of further hydrogen chloride, and the absorption finally ceases. Therefore, the introduction of further amounts of methyl nitrite and hydrogen chloride hardly effects an increase of the yield but impairs the quality of the oximinoacetophenone. The major part of the methyl nitrite introduced leaves the reaction mixture unchanged. When subsequently removing from the mixture not only the methanol formed from the consumed methyl nitrite but also the already formed oximinoacetophenone by extraction with aqueous alkaline solutions, the nitrosation reaction proceeds again at a satisfactory rate, but ceases once more after the conversion of another quantity of acetophenone. It has been found that especially favorable results are obtained by interrupting the addition of methyl nitrite before the absorption begins to subside, thereafter extracting the mixture with an aqueous alkali metal solution and repeating the nitrosation reaction as described above.

Whereas in the nitrosation reaction of acetophenone according to the embodiments of the Claisen Sandmeyer method described in the literature, large quantities of high boiling and tarry residues are formed in the regeneration of the solvents, the formation of such undesired by-products is substantially suppressed in the herein described process. Slight portions of chlorinated and higher nitrosated by-products (for example the so-called pernitroso compounds) are decomposed by the repeated interaction of alkali and removed via the aqueous phase so that any enrichment of troublesome by-products hardly occurs. Regeneration of the solvents used is required, if at all, after very long periods of operation or after the conversion of large quantities of the reactants only; regeneration can readily be accomplished in the large scale production by distillation and the losses of solvents are very low. Any consumed ketone can be replaced from time to time.

The resulting oximinoacetophenone can be recovered from the aqueous alkaline extracts either in free form by acidification or as an alkali metal salt by the addition of sodium chloride. The extracts can also be used, if desired in further reactions without previously isolating the oximinoacetophenone. By a repeatedly alternately incomplete nitrosation reaction, extraction with an aqueous alkali metal solution and acidification of the extracts, the invention allows of economically producing for the first time oximinoacetophenone (which has been obtained by the prior art methods in poor yields and inferior quality only) in a yield of 90 percent and in a satisfactory degree of purity. As a quantity which is insufficient for effecting complete nitrosation reaction, there is to be understood about 0.1 to about 50 percent (preferably about 1 – 15 percent) of the theoretically required amount, depending on the type of the ketone to be nitrosated.

Although it has previously been possible to nitrosate higher alkylarylketones, for instance propiophenone, to yield oximinoketones in substantially better yields and in a state of higher purity than methylarylketones, the herein described process has proved to be superior also in the nitrosation reaction of the latter ketones, which is demonstrated by substantially quantitative yields, by the absence of undesired by-products and the avoidance of the expensive and troublesome regeneration of the solvents.

The nitrosation reaction as well as the extraction operation can be accomplished at equal or different temperatures within the range between about −10° to +50° C, preferably +15° to +45° C.

The solvents to be used in the process according to the invention may belong to different classes of compounds, however they must meet the following demands:

1. they must be inert under the reaction conditions;
2. in the system with water or the aqueous alkaline extraction solutions within the temperature range applied, they must show a miscibility gap which is as complete as possible;
3. the ketone and oximinoketone must be soluble to a sufficient degree;
4. the solvent must substantially differ in density from the aqueous phase, and
5. the distribution coefficient of the oximinoketone in the system "absorbing aqueous alkaline phase"/ "delivering organic phase" shall have a value as high as possible.

The solvents which are mentioned below by way of example can be used as such or in combination: ethyl-n-butylether, di-n-propylether, diisopropylether, di-n-butylether, di-sec.-butylether, di-n-amylether, diisoamylether, 4,4'-dichloro-di-n-butylether, anisole, phenetole, methyl-cyclohexylether, benzylmethylether, benzylethylether, nitrobenzene, methylene chloride, chloroform.

The alkyl nitrites used in the herein described process are preferably derived from lower alcohols which are readily soluble in water, for example methyl nitrite and ethyl nitrite, as well as n- and i-propylnitrite, and are reacted in the liquid or in the gaseous state. As examples of hydrogen halide or compounds yielding hydrogen halide there may be mentioned hydrogen bromide and aqueous hydrobromic acid, preferably however hydrogen chloride and hydrochloric acid.

Aqueous alkaline reacting solutions, for example aqueous sodium or potassium carbonate solution, potassium hydroxide solution, especially sodium hydroxide solution, are used in the extraction of the oximinoketones, the "alkali" concentration preferably varying within the range between about 0.3 to about 3 normal. For increasing the difference in density or for improving the phase separation, substances which are customarily used for this purpose can be added to the "alkali" solution, for example neutral salts, such as sodium chloride or sodium sulphate. The extraction of oximinoacetophenone and most of its nuclear substituted derivatives is generally accomplished by a single distribution between the phases; in the case of oximinopropiophenone, its nuclear substituted derivatives as well as the higher oximinoacylophenones, repeated extraction operations may be expedient in view of the less favorable distribution coefficients; to improve the utilization of the aqueous alkali metal solution the extraction operations are carried out according to the multiplicative distribution method.

The above described advantages, viz. a high reaction rate, high stoichiometrical yield and the production of products in a state of high purity, no enrichment of products in the reaction mixture and therefore no necessity of regenerating solvents, the use of small quantities of hydrogen chloride in the nitrosation reaction which are taken from aqueous hydrochloric acid, the avoidance of strong acidic waste water, render the process of the invention suitable for continuous operation which ensures a high space-time-yield.

The α-oximinoketones obtainable by the herein described process are valuable intermediates in the synthesis of dyestuffs, analytical reagents, pesticides as well as optical brightening agents (French Pat. No. 1,480,699). The other compounds obtainable by the herein described process can be used in equal manner as the compounds described in the aforesaid French patent.

The invention is further illustrated by the following examples without being restricted thereto.

EXAMPLE 1

Acetophenone is discontinuously nitrosated in the following apparatus:

1. Reaction flask: 4 liter-four-necked flask equipped with a gas supply stirrer, a gas introducing frit for hydrogen chloride, a thermometer, a reflux condenser provided with a bubble counter and a discharge cock at the bottom.
2. Methyl nitrite generator: 2 liter-four-necked flask equipped with a stirrer, a thermometer, a graduated 500 ml dropping funnel and a reflux condenser provided with a bubble counter which is connected to the gasification stirrer of the reaction flask.

The flask of the methyl nitrite generator is charged with 360 g (5.2 mols) of sodium nitrite, 400 ml of water and 235 ml (= 186 g; 5.8 mols) of methanol; the dropping funnel is filled with 500 ml of 10 N sulphuric acid. The charge is renewed each time after the consumption of 5 mols of methyl nitrite (100 ml of 10 N sulphuric acid substantially correspond to 1 mol of methyl nitrite).

1.5 liter of di-n-butylether and 480 g (4.0 mols) of technical acetophenone are placed in the reaction flask. To remove impurities of the technical ketone which impair the quality of the oximinoacetophenone, the mixture is vigorously stirred with 250 ml of 1.5 N sodium hydroxide solution. After some minutes the mixture is allowed to settle after the stirrer has been stopped, the heavy aqueous alkaline layer is withdrawn via the bottom valve and the slightly yellowish colored liquid is discarded. Gaseous hydrogen chloride is subsequently introduced, slowly and with stirring, from a cylinder at room temperature into the reaction mixture thus purified until a drop test on Congo paper shows a distinct acid reaction. The introduction of hydrogen chloride is stopped and methyl nitrite gas, which is evolved by the gradual dropwise addition of 10 N sulphuric acid into the aqueous methanolic nitrite solution, is passed in. The introduced methyl nitrite is absorbed at a high rate; the output bubble counter provided on the reflux condenser of the reaction flask remains idle. The reaction mixture must always show a vigorous acidic reaction on Congo paper; if necessary, further hydrogen chloride has to be passed in. After the absorption of 0.9 mol of methyl nitrite, the introduction of nitrite is interrupted and the reaction mixture stirred for another 10 to 15 minutes. During the nitrosation reaction the temperature rises from about 20° to 32° C.

600 ml of ice-cold 1.5 N sodium hydroxide solution are run into the mixture through the thermometer pipe with stirring at high speed; after vigorously stirring for a further about 2 minutes the mixture is allowed to settle after the stirrer has been stopped. The heavy yellow-brown colored aqueous alkaline layer separates soon and completely from the almost colorless light organic phase. The alkaline extract is discharged through the bottom valve. The organic solution remaining in the flask, which has assumed again room temperature, is acidified again with hydrogen chloride and treated while stirring with 0.8 mol of methyl nitrite gas which is practically completely absorbed. The temperature rises to 30.5° C. After stirring for another brief period of time extraction is repeated as described above with 550 ml of ice-cold 1.5 N sodium hydroxide solution.

The nitrosation reaction and the alkaline extraction operation are carried out first 5 times in succession. Each of the aqueous alkaline extracts is added separately with stirring to a mixture of ice and concentrated hydrochloric acid in an amount which is sufficient for weak acidification (pH 2.5 to 3) whereupon the oximinoacetophenone precipitates in cream-colored almost white crystals which, after standing for some time, are rapidly filtered off with suction, washed with little ice-water and dried in the atmosphere. The Table below shows the consumption of nitrite, the amount of 1.5 N sodium hydroxide solution used each time for extraction as well as the yield of oximinoacetophenone. After the fifth passage consumed ketone is replaced by the addition of 264 g (2.2 mols) of technical acetophenone to the reaction mixture. After a purification extraction with 200 ml of 1.5 N sodium hydroxide solution – as described above – and removing the aqueous alkaline layer, the reaction mixture is reacted again in equal manner 5 times with hydrogen chloride and methyl nitrite and extracted with 1.5 N-sodium hydroxide solution (passages 6 to 10).

TABLE

| Passage | Methyl nitrite consumed | Sodium hydroxide solution consumed | Yield of oximinoketone |
|---|---|---|---|
| 1 | 0.9 mol | 600 ml | 91 g = 0.61 mol |
| 2 | 0.8 mol | 550 ml | 81 g = 0.54 mol |
| 3 | 0.7 mol | 475 ml | 65 g = 0.44 mol |
| 4 | 0.6 mol | 400 ml | 52 g = 0.35 mol |
| 5 | 0.5 mol | 350 ml | 38 g = 0.25 mol |
| 6 | 0.9 mol | 600 ml | 95 g = 0.64 mol |
| 7 | 0.8 mol | 550 ml | 78 g = 0.52 mol |
| 8 | 0.7 mol | 475 ml | 60 g = 0.40 mol |
| 9 | 0.6 mol | 400 ml | 48 g = 0.32 mol |
| 10 | 0.5 mol | 350 ml | 30 g = 0.20 mol |
| Total: | 7.0 mols | 4750 ml | 638 g = 4.27 mols |

To determine the yield the experiment is interrupted after the tenth passage. The reaction mixture is thoroughly extracted once more with 1.5 N sodium hydroxide solution and subsequently rectified on a packed column. After separating off the di-N-butylether (b.p. 105° – 106° C / 250 mm/Hg; recovery 1.41 l) and after a small intermediate run (12 g) 155.5 g = 1.30 mols of pure acetophenone distill over at 100 mm/Hg and 132° – 133° C, while a slight amount of non-distilled material remains in the sump. Consumption of acetophenone: 4.0 + 2.2 − 1.3 mols = 4.9 mols. Yield of oximinoacetophenone: 638 g = 4.27 mols (= 87 % of the theoretical).

The oximinoacetophenone (m.p. 123° – 124° c) is sufficiently pure for most purposes; the product can be purified by recrystallization from methanol whereupon the melting point rises to 128° C. Yield: 606 g = 82.5 percent of the theoretical.

EXAMPLE 2

410 g (2.5 mols) of p-ethoxyacetophenone are dissolved in 1.2 l of di-N-propylether and reacted with totally 2.5 mols of methyl nitrite in six passages analogously as described in Example 1 for acetophenone. After six extraction operations with totally 2.25 l of 1.5 N sodium hydroxide solution, precipitation with hydrochloric acid, filtering with suction, washing and drying, there are obtained 322 g = 1.72 mols of oximino-p-ethoxyacetophenone of the m.p. 110 – 112° C.

By rectifying the reaction mixture there are recovered 9307 g = 0.57 mol of p-ethoxyacetophenone. Consumption of p-ethoxyacetophenone: 2.5 − 0.57 mol = 1.93 mols. Yield of oximino-p-ethoxyacetophenone: 1.72 mols = 89 percent of the theoretical.

The product is sufficiently pure for most purposes; by recrystallising from methanol there is obtained a completely pure product in form of light yellow crystals of the m.p. 116 – 118° C.

EXAMPLE 3

Acetophenone is continuously reacted with methyl nitrite in the apparatus illustrated in FIG. 1: 1. Reaction part: The reactor 1 is a vessel of cylindrical dimensions which has a capacity of about 4 l and which is equipped with a thermometer and a feeding pipe connected via the pump 2 to the level vessel 3 which has a capacity of 3 l and is arranged at an elevated level. The vessel is provided with a discharge cock 3a. The upper part of the level vessel 3 is connected via pipe 5 to the reactor 1 and via the outlet bubble counter 6 to the atmosphere. The overflow pipe 4 allows the return passage of the liquid from the level vessel 3 to the reactor 1. The methyl nitrite generator 7 is a 3 l flask equipped with stirrer, thermometer, graduated 1 l dropping funnel, discharge pipe and gas discharge pipe which is connected to the frit of the reactor 1 via the input bubble counter 9. 2. Extraction part: The mixer 11, a stirrer-type vessel of cylindrical dimensions with a capacity of about 600 ml, which is equipped with a high-speed stirrer and which is connected via a bottom tube to the graduated dropping funnel 12 as well as via a second bottom tube and the valve 10 to the gravity tube 4, is connected via the pipe 13 to the settling chamber 14 from which the two separate phases can flow off via two pipes. The pipe from the lighter phase 15 is extended to the second mixer 16 which is connected to the graduated 2 l dropping funnel and exactly corresponds to the first mixer 11. The heavy phase is passed via pipe 22 into the precipitation vessel 24 which is equipped with a stirrer and a second discharge pipe 25. The second mixer 16 is connected via pipe 18 to the settling chamber 19 the dimensions of which correspond to the chamber 14. The light phase flows from the settling chamber 19 via pipe 20 and through a second separator back into the reactor 1. Pipe 20 is connected to a graduated 1 l dropping funnel 21. The pipe 23 for the heavy phase is likewise extended to the precipitation vessel 24.

736 g (10.6 mols) of sodium nitrite, 800 ml of water and 520 ml (= 412 g; 12.8 mols) of methanol are introduced into the methyl nitrite generator 7 and the dropping funnel 8 is charged with 1 l of 10 N sulphuric acid. The total charge of the methyl nitrite generator 7 and the dropping funnel 8 is renewed each time after consumption.

To the reactor 1 there is charged at room temperature a mixture of 5 l of di-N-butylether, 1200 g (10.0 mols) of acetophenone and 10 ml of hydrochloric acid $d = 1.19$. During the addition the pump 2 is operated so that the level vessel 3 is also filled, the solution flows back via the overflow pipe 4 to the level vessel 3, and there is a continuous cycle between the reactor 1 and the level vessel 3. The dropping funnel 12 is charged with 2 l of 2 N sodium hydroxide solution, the dropping funnel 17 with 2 l of hydrochloric acid $d = 1.16$ (= 31.5 percent by weight of hydrogen chloride) and the hopper 21 with 1 l of acetophenone. 10 N sulphuric acid is introduced dropwise with stirring from the dropping funnel 8 into the flask 7. The evolution of methyl nitrite sets in immediately and the methyl nitrite enters the acid ketone solution in the reactor 1 through the frit. While the input counter 9 operates at high speed the output counter 6 remains completely idle.

After the introduction of about 0.8 mol of methyl nitrite (100 ml of 10 N sulphuric acid correspond to 1 mol of methyl nitrite) the continuous extraction operation is started. For this purpose the stirrer means of the mixers 11 and 16 are put into operation, 2 N sodium hydroxide solution is introduced from the dropping funnel 12 and hydrochloric acid from the dropping funnel 17 into the mixers 11 and 16 respectively. Finally the valve 10 is opened so that the organic reaction solution partially enters the first mixer 11 where the solution is thoroughly mixed with the sodium hydroxide solution. The resulting oximinoacetophenone passes over here almost quantitatively from the organic phase in form of sodium salt into the aqueous phase which washes out the methanol formed from the methyl nitrite. Besides, small quantities of chlorinated and oxidized by-products are decomposed by the alkaline treatment in the mixer 11 and extracted from the organic phase. The hydrogen chloride dissolved in the organic phase is automatically removed so that further hydrogen chloride must be added in a succeeding step. This is accomplished in the mixer 16. The mixture is first centrifuged from the mixer 11 through pipe 13 into the settling chamber 14 where the two phases rapidly separate from one another and flow off via pipe 22 and 15 respectively.

The quantity of sodium hydroxide solution to be taken from the dropping funnel 12 is controlled with the valve 10 open in such a manner that the orange-brown colored aqueous solution of the sodium salt of oximinoacetophenone flowing off from the chamber 14 via pipe 22 still reacts slightly triacene alkaline.

The extracted organic solution which is passed off via pipe 15 is charged again with hydrogen chloride in the mixer 16 by the hydrochloric acid coming from the dropping funnel 17. After the phase separation in the chamber 19 the light organic layer flows back through pipe 20 to the reactor 1. On the passage to the reactor 1 consumed starting material is replaced by the dropwise addition of acetophenone from the storage vessel 21; the feeding rate of acetophenone from the storage vessel 21 is controlled in accordance with the yield of oximinoacetophenone per unit of time.

The heavy aqueous hydrochloride layer flows from the chamber 19 through pipe 23 into the precipitation vessel 24 into which the alkaline solution of the sodium salt of oximinoacetophenone passes with stirring from the chamber 14 through the pipe 22. The quantity of hydrochloric acid passed in dropwise through the pipe 23 is controlled by the valve of the dropping funnel 17 so that the pasty crystalline suspension of the free oximinoacetophenone formed in the precipitation vessel 24 shows a pH value of about 3.0 to 3.5. The crystal paste is continuously discharged through the wide outlet pipe 25, collected on a suction filter, washed with some cold water, sucked dry and dried in the drying chamber at 65° C in circulating air.

After the extraction part has been put into operation the two mixers and the settling chambers are gradually filled with the reaction solution. In order to substantially maintain the liquid level in the reactor constant a solution of 240 g (2.0 mols) of acetophenone in 1 l of di-N-butylether is concurrently introduced into the reactor 1 through the supply pipe.

After a brief period of operation a substantially constant concentration of the oximinoacetophenone in the solution circulating through the reactor 1 and the level vessel 3 results at controlled velocities on the one hand, of the supply of methyl nitrile (timing adjustment on 8a) and, on the other hand, of the discharge of the resulting oximinoacetophenone (adjustment on the valve 10). Since the adjustments on the graduated dropping funnel 12, the 2 l dropping funnel 17 and the 1 l dropping funnel 21 which depend on the position of valve 10 can easily be determined, stationary conditions result soon in the running apparatus. During operation the reaction temperature remains constant within the very favorable range of 27° – 29° C; the rate of the nitrosation reaction is then so high that any methyl nitrite can substantially no longer be detected in the solution entering the mixer 11. The reaction mixture in the reactor 1 continually contains sufficient quantities of hydrogen chloride.

To determine the yield the apparatus is put out of operation after 180 hours; all solutions are discharged and worked up.

| Consumption of | | | |
|---|---|---|---|
| 1. methyl nitrite: | | | 176.0 mols |
| 2. acetophenone: | quantity initially introduced | 1.44 kg | |
| | quantity introduced during operation | +18.96 kg | |
| | | 20.40 kg | |
| | recovered after interruption | −0.91 kg | |
| | | 19.49 kg | = 162.4 mols |
| 22.40 kg of light cream-colored oximinoacetophenone of the m.p. 123 – 125° C are obtained. | | | = 150.33 mols |

Yield: 92.5 percent of the theoretical, referred to the acetophenone reacted. Utilization of methyl nitrite: 85.5 percent.

EXAMPLE 4

18.32 kg (136.6 mols) of p-methylacetophenone are continuously reacted with methyl nitrite and hydrogen chloride in analogous manner as acetophenone in the apparatus described in Example 3. There are obtained 22.65 kg of air-dry crystal-water-containing almost colourless p-methylacetophenone of the m.p. 78° – 84° C and a content of 20.39 kg (91.4 percent content the theoretical) of anhydrous oximinoketone which is sufficiently pure for most purposes. The product can be recrystallised from methanol and melts at 104° – 106° C after drying.

Consumption of nitrite: 149.0 mols; thus the conversion of methyl nitrite is 84.1 percent.

EXAMPLE 5

8.40 kg (56.0 mols) of p-methoxyacetophenone are reacted with methyl nitrite in the presence of hydrogen chloride under the conditions and in the manner described in Example 3 for acetophenone. There are obtained 9.21 kg (91.9 percent of the theoretical) of light cream-colored p-methoxy-oximinoacetophenone of the m.p. 116° – 119° C. Consumption of methyl nitrite: 59.6 mols; thus the conversion is 86.3 percent.

EXAMPLE 6

Propiophenone is continuously reacted in the apparatus and in the manner described in Example 3, however at a reactor temperature of 40° – 42° C and with the addition of 6.5 l di-sec.-butylether as inert solvent.

In 160 reaction hours 600 mols of methyl nitrite are consumed in the reaction of totally 78.0 kg (= 580 mols) of propiophenone. There are obtained 89.5 kg (= 549.9 mols) of dry and highly pure ox-iminopropiophenone; the yield is 94.5 percent of the theoretical, and the conversion of methyl nitrite 91.3 percent.

What is claimed is:

1. Process for the preparation of aryl-α-ox-iminoketones and salts thereof, said aryl-α-ox-iminoketones having the formula:

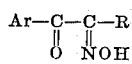

wherein R is selected from the group of hydrogen, $C_1$–$C_5$ alkyl, and methylene directly linked to Ar, and Ar is a $C_6$–$C_{10}$ aromatic radical unsubstituted or substituted with a substituent selected from the group of halogen, lower alkyl, phenyl, phenyl substituted by halogen, lower alkyl or alkoxy, lower alkoxy, phenoxy, phenoxy substituted by halogen, lower alkyl or lower alkoxy, nitro and cyano,
which comprises the steps of:
A. nitrosating
  1. a ketone having the formula

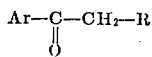

wherein Ar and R are as previously defined, by adding thereto
  2. from 0.1 to 50 mol percent of an alkyl nitrite which amount is insufficient for complete nitrosation, in the presence of
  3. a compound selected from the group of hydrogen halide and hydrogen halide donors, in an inert organic solvent immiscible with water;
B. interrupting the addition of alkyl nitrite before the initial rate of absorption of the alkyl nitrite begins to subside,
C. extracting the aryl α-oximinoketone formed with an aqueous alkaline solution;
D. removing the aqueous alkaline extract formed from the reaction mixture; and
E. again nitrosating said ketone with said alkyl nitrite as in step (A) and thereafter repeating steps (B), (C) and (D).

2. Process of claim 1 wherein consumed ketone is replenished.

3. Process of claim 1 wherein the nitrosation reaction is carried out continuously by alternately repeating steps (A), (B), (C) and (D) and periodically replenishing the ketone consumed.

4. Process of claim 1 wherein the aryl α-oximinoketone formed is isolated from said aqueous alkaline extract.

5. Process of claim 1 wherein the quantity of alkyl nitrite is about 0.1 to about 15 percent of the theoretically required amount.

6. Process of claim 1 wherein nitrosation and extraction are carried out at the same or different temperatures in the range between about −10° to +50° C.

7. Process of claim 1 wherein the alkyl nitrite is selected from the group of methyl nitrite, ethyl nitrite, n-propylnitrite and isopropyl nitrite.

8. Process of claim 1 wherein the hydrogen halide or hydrogen halide donor is hydrogen bromide, aqueous hydrobromic acid, hydrogen chloride and hydrochloric acid.

9. Process of claim 1 wherein the ketone is selected from the group consisting of acetophenone, m- and p-fluoroacetophenone, m- and p-chloroacetophenone, m- and p-bromoacetophenone, 3,4-dichloroacetophenone, o-, m- and p-methylacetophenone, p-ethylacetophenone, p-propylacetophenone, p-butylacetophenone, o-, m- and p-methoxyacetophenone, o-, m- and p-ethoxyacetophenone, p-phenoxyacetophenone, p-phenylacetophenone, 2-methoxy-4-methylacetophenone, α-acetonaphthone, β-aceto-naphthone, propiophenone, o-, m- and p-fluoropropiophenone, o-, m- and p-chloropropiophenone, o-, m- and p-bromopropiophenone, m-cyanopropiophenone, o- and p-methoxypropiophenone, p-methyl- and ethyl-propiophenone, butyrophenone, p-methylbutyrophenone, p-methoxybutyrophenone, valerophenone, p-methylvalerophenone, caprophenone, indanone-(1), and 3-, 4-, 5- and 6-methylindanone-(1).

* * * * *

UNITED STATES PATENT OFFICE
CERTIFICATE OF CORRECTION

Patent No. 3,697,596　　　　Dated October 10, 1972

Inventor(s) ALFONS DORLARS

It is certified that error appears in the above-identified patent and that said Letters Patent are hereby corrected as shown below:

Column 1, line 4, "aryl-αoximinoalkyl" should be --aryl-α-oximinoalkyl- --; column 3, line 22, "p-methylvalerophenone" should be --p-phenoxyacetophenone--; column 3, line 24, "ß-acetonaphtone" should be --ß-acetonaphthone--; column 7, line 59, "322 g" should be --332 g--; column 7, line 64, "9307 g" should be --93.7 g--; column 8, line 14, "31" should be --3 l.--; column 8, line 14, before "vessel" insert --level--; column 12, line 2, "αoximinoketone" should be --α-oximinoketone--

Signed and sealed this 24th day of April 1973.

(SEAL)
Attest:

EDWARD M. FLETCHER, JR.　　　　ROBERT GOTTSCHALK
Attesting Officer　　　　　　　　Commissioner of Patents